UNITED STATES PATENT OFFICE.

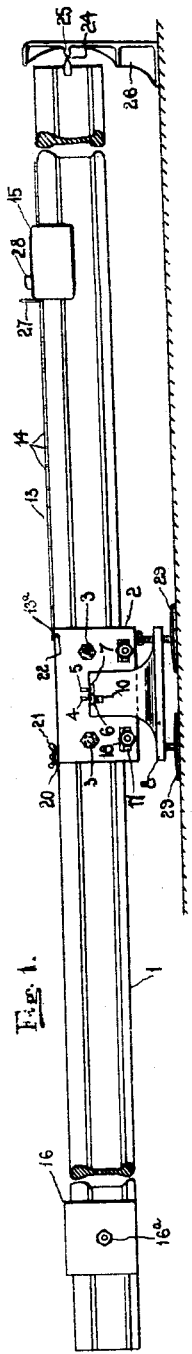
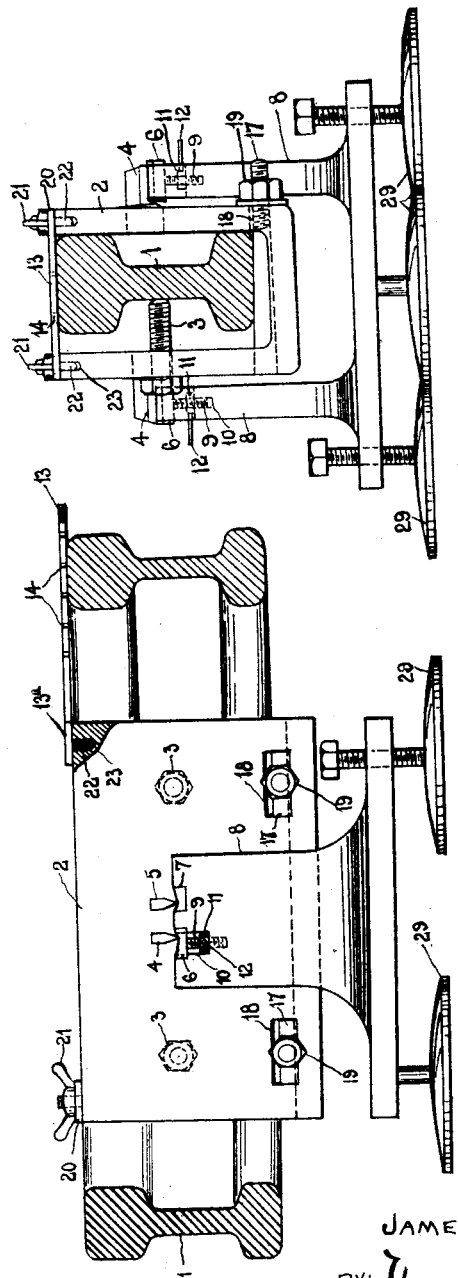

JAMES DOBSON, OF BIRMINGHAM, ENGLAND, ASSIGNOR TO HENRY POOLEY AND SON, LIMITED, OF BIRMINGHAM, ENGLAND.

WEIGHING APPARATUS.

1,212,027. Specification of Letters Patent. Patented Jan. 9, 1917.

Application filed July 12, 1916. Serial No. 108,924.

*To all whom it may concern:*

Be it known that I, JAMES DOBSON, a subject of the King of Great Britain, residing at John Bright street, in the city of Birmingham, in the county of Warwick, England, have invented a new and useful Weighing Apparatus; and I do hereby declare the following to be a full, clear, and exact description of the same.

This invention has reference to a new means of obtaining the weight of railway rails, girders, beams, or similar sectional lengths, but is particularly applicable for use in determining wear or variations in rail lengths.

The object of the invention is to provide a simple, compact and readily portable apparatus which shall accurately indicate the weight of the rail or other sectional length without necessitating the employment of an ordinary weighbeam, steelyard, or other equivalent device as heretofore.

The invention consists of an apparatus for obtaining the weight of the rail or other sectional length, the rail or other length forming or operating as its own weighing lever or steelyard and being supported by a bearing or bearings, the said rail or other sectional length being initially balanced about a determined point within its length, the said point being subsequently displaced or altered, the weight being obtained by rebalancing the displaced rail or other length by suitable adjustable means.

The invention will now be described as applied to one kind of apparatus for weighing railway rails, though the apparatus may with advantage be adapted to the weighment of lengths of girders, beams, channel iron, or applied to other analogous uses, and moreover many different constructions of apparatus and mechanism therefor may be employed.

Figure 1 of the accompanying drawings is a side elevation of the apparatus, Fig. 2 is a part sectional side elevation of part of Fig. 1 to an enlarged scale, and Fig. 3 is an end elevation of Fig. 2.

The center of gravity of the rail 1 to be weighed is first approximately ascertained and about this point is then located a small cradle or stirrup 2 or like device adapted to partially or wholly embrace this part of the rail section, the said cradle or stirrup 2 being provided with suitable clamping means such as bolts 3, 3, for rigidly securing it to the rail. The cradle or stirrup is provided on either side with two knife-edged centers 4 and 5, one of the said centers (4) being adapted to be located approximately on the center of gravity of the rail, the other center (5) being a determined distance therefrom and in horizontal alinement therewith. The knife-edged centers 4 and 5 are adapted to rest upon bearing blocks 6 and 7 respectively, suitably mounted on a pedestal 8, the pedestal preferably being so arranged that one or other of the said centers as desired is resting on its bearing block. Any suitable means may be employed for achieving this purpose, such, for example, as permitting a slight vertical movement to be imparted to one of the bearing blocks, and in the construction illustrated the bearing blocks 6 are connected to screws 9 partly located in slots 10 in the pedestal 8, the said screws being adapted to turn within nuts 11, 11, when an angular movement is imparted to the nuts by means of the pins 12, 12. The other mechanism required for completing this apparatus consists of a graduated scale 13 for indicating the weight of the rail, the said scale being suitably mounted on a cradle or stirrup 2 so as to rest on the upper surface of the rail 1, said scale having locating notches 14 therein; a poise weight 15 adapted to be traversed along the said scale 13, and a counterbalancing weight 16 adapted to be traversed along the said rail upon the opposite side of the centers to that upon which the poise weight is mounted. For the purpose of adjusting the sensitiveness of the apparatus by accurately setting the rail 1 within the cradle or stirrup 2 so that the center of gravity of the combined oscillating parts is at a suitable distance below the horizontal plane containing the face line of the knife-edges 4 and 5, I may employ wedge bolts 17, 17, which are mounted in slots 18, 18, in the cradle or stirrup 2 and locked in the desired position by means of the nuts 19. The cradle or stirrup 2 is tied together at the top at one end by means of the bar 20 and the fly nuts 21, and at the other end by a crosspiece 13ª, forming an integral part of the scale 13, the crosspiece being provided with pins 22, 22, which can be located in the slots 23, 23, in the top of the cradle or stirrup 2. To accurately indicate the position of balance or equilibrium of the rail 1, I attach an index pointer 24 to one end thereof, the said pointer being adapted to register with a pointer 25 fixed to a bracket 26 when the apparatus is in a position of equilibrium.

The poise weight 15 is traversed along the graduated scale 13 and located at determined positions thereon by means of a nib or like known device connected to the handle 27 of the poise weight, the nib engaging in the notches 14 of the scale 13. In the construction of apparatus shown the poise weight 15 is provided with a minor poise weight 28 traversing on the major poise weight 15 in known manner for the purpose of accurately determining the weight of the rail, but other known forms of poise weights may be employed. The pedestal 8 is provided with three leveling feet 29 for the purpose of accurately setting the apparatus upon the ground or other surface.

The method of employing this apparatus is as follows:—The length of rail to be weighed has its approximate center of gravity initially located, the cradle or stirrup 2 is then rigidly clamped or secured to the said part of the rail (approximately central) so that the knife-edges center 4 is located on or substantially on the said center of gravity. The graduated scale 13 is connected to the cradle or stirrup 2 so that this scale together with the poise weight 15 mounted on the scale can be applied to the rail 1 in one operation and their position in relation to the initial balancing point or center of gravity of the rail is thereby determined. The knife-edged center 4 of the cradle or stirrup 2 which is located approximately on the center of gravity of the rail is now resting upon its bearing block 6 on the pedestal 8, and the rail is now accurately balanced about the said center by means of the counterbalance weight 16, the poise weight 15 being located at the zero position of the graduated scale. When the balance has been accurately ascertained, the counterweight 16 is locked in position by means of the screw 16ª. Now, by imparting a lowering movement to the bearing blocks 6, 6, in the manner previously stated, the weight of the rail and its appendages is transferred to the other knife-edged center 5 of the cradle or stirrup 2, thereby, of course, throwing the rail out of balance. The poise weight 15 mounted on the graduated scale 13 is then traversed until a position of balance again obtains, when the position of the said poise weight upon the graduated scale indicates the weight of the rail. (See Fig. 1).

It will be obvious that an apparatus as hereinbefore mentioned will require to have the weight of the sliding poise weight 15, the distance apart of the two knife-edged centers 4 and 5, and the graduations of the weight indicating scale 13 accurately calculated before a weighment can be effected, as would be the case in any ordinary weighing apparatus, but once this leverage and the weight of the poise weight has been determined the apparatus may be readily employed with equal facility on rails of varying sections and lengths, suitable adjusting devices (such as the wedge bolts 17 and the clamping or fixing bolts 3) being provided to adapt the apparatus to the different sections of rail.

I desire it to be understood that I do not limit the application or construction of the present invention to the particular uses and apparatus hereinbefore described.

What I claim is:—

1. An apparatus for obtaining the weight of railway rails, beams, girders or similar sectional lengths, comprising in combination means adapted to receive the rail or other sectional length to be weighed, means pivotally supporting the receiving means for initially balancing the rail and its appendant parts about a point in proximity to its center of gravity, means adapted to pivotally support the receiving means for displacing the fulcrum point of the rail or other sectional length from the said point to another predetermined point in its length, and means for rebalancing the rail or other sectional length about the said predetermined point whereby the weight of the rail or other sectional length is obtained.

2. An apparatus for obtaining the weight of railway rails, girders, beams or similar sectional lengths, comprising a cradle or stirrup adapted to receive the rail or other sectional length to be weighed, two knife-edged centers on the said cradle about either of which the rail or other sectional length and its appendant parts can be balanced, and means for balancing the said rail or other sectional length and its appendant parts about either of the said centers.

3. An apparatus for obtaining the weight of railway rails, girders, beams or similar sectional lengths, comprising in combination means adapted to receive the rail or other sectional length to be weighed, means pivotally supporting the receiving means for initially balancing the rail and its appendant parts about a point in proximity to its center of gravity, means adapted to pivotally support the receiving means for displacing the fulcrum point of the rail or other sectional length from the said point to another predetermined point in its length, adjustable means for adapting the apparatus to different sections of rail or other sectional length, and means for rebalancing the rail or other sectional length about the said predetermined point whereby the weight is obtained.

4. An apparatus for obtaining the weight of railway rails, girders, beams or similar sectional lengths, comprising in combination means adapted to receive the rail or other sectional length to be weighed, means pivotally supporting the receiving means for initially balancing the rail and its appendant parts about a point in proximity to its center of gravity, means adapted to pivotally support the receiving means for displacing the fulcrum point of the rail or other sectional length from the said point, a second point of support for the displaced rail or other sectional length, leveling means for accurately setting the apparatus upon the ground or other surface, adjustable means for rebalancing the displaced rail or other sectional length about the said predetermined point whereby the weight of the rail or other sectional length is obtained.

5. An apparatus for obtaining the weight of railway rails, girders, beams or similar sectional lengths, comprising a cradle adapted to receive the rail or other sectional length to be weighed, two knife-edged centers on the said cradle about either of which centers the rail or other sectional length and its appendant parts can be alternatively balanced, a graduated scale removably connected to said cradle, means for balancing the said rail or other sectional length and its appendant parts about either of the said centers, said means embodying a poise weight adapted to be traversed along the said scale to indicate the weight of the rail or other sectional length.

6. An apparatus for obtaining the weight of railway rails, girders, beams or similar sectional lengths, comprising in combination a cradle adapted to receive the rail or other sectional length to be weighed, two knife-edged centers on the said cradle about either of which the rail or other sectional length and its appendant parts can be alternatively balanced, a graduated scale removably connected to said cradle, means for balancing the said rail and its appendant parts about either of the said centers, and means for accurately indicating the position of balance of the said rail or other sectional length within the apparatus.

7. An apparatus for obtaining the weight of railway rails, girders, beams or similar sectional lengths, comprising in combination a cradle adapted to receive the rail or other sectional length to be weighed, two knife-edged centers on the said cradle about either of which the rail or other sectional length and its appendant parts can be alternatively balanced, a bearing block fixed in relation to one of the said centers, a bearing block adjustably in relation to the other of said centers, a graduated scale connected to said cradle, adjustable means for balancing the said rail or other sectional length about either of the said centers alternatively, and means for indicating the position of balance of the rail or other sectional length within the apparatus.

In testimony whereof, I have signed my name to this specification in the presence of two subscribing witnesses.

JAMES DOBSON.

Witnesses:
GEORGE E. FOLKS,
GLADYS DAVIES.

Copies of this patent may be obtained for five cents each, by addressing the "Commissioner of Patents, Washington, D. C."